Dec. 22, 1925.

R. M. McGEE 1,566,335

COIN HANDLING MACHINE

Filed June 5, 1919 21 Sheets-Sheet 1

Inventor
Richmond M. McGee
By his Attorneys
Kenyon & Kenyon

Dec. 22, 1925.

R. M. McGEE 1,566,335

COIN HANDLING MACHINE

Filed June 5, 1919

Inventor
Richmond M. McGee,
By his Attorneys
Kenyon & Kenyon

Dec. 22, 1925.                                                                          1,566,335
                                    R. M. McGEE
                              COIN HANDLING MACHINE
                          Filed June 5, 1919          21 Sheets-Sheet 4

Inventor
Richmond M. McGee
By his Attorney
Kenyon & Kenyon

Dec. 22, 1925.

R. M. McGEE 1,566,335

COIN HANDLING MACHINE

Filed June 5, 1919

Inventor
Richmond M. McGee
By his Attorneys,
Kenyon & Kenyon

Dec. 22, 1925.

R. M. McGEE 1,566,335

COIN HANDLING MACHINE

Filed June 5, 1919

Inventor
Richmond M. McGee
By his Attorneys
Kenyon & Kenyon

Dec. 22, 1925.

R. M. McGEE

COIN HANDLING MACHINE

Filed June 5, 1919    21 Sheets-Sheet 8

1,566,335

Inventor
Richmond M. McGee
By his Attorneys
Kenyon & Kenyon

Dec. 22, 1925.

R. M. McGEE 1,566,335

COIN HANDLING MACHINE

Filed June 5, 1919

Inventor
Richmond M. McGee,
By his Attorneys
Kenyon & Kenyon.

Dec. 22, 1925.  
R. M. McGEE  
COIN HANDLING MACHINE  
Filed June 5, 1919  
1,566,335  
21 Sheets-Sheet 10

Inventor  
Richmond M. McGee,  
By his Attorneys  
Kenyon & Kenyon.

Dec. 22, 1925.                                                1,566,335
R. M. McGEE
COIN HANDLING MACHINE
Filed June 5, 1919                    21 Sheets-Sheet 11

Inventor
Richmond M. McGee,
By his Attorneys.
Kenyon & Kenyon

Dec. 22, 1925. 1,566,335
R. M. McGEE
COIN HANDLING MACHINE
Filed June 5, 1919 21 Sheets-Sheet 12

Inventor
Richmond M. McGee,
By his Attorneys
Kenyon & Kenyon

Dec. 22, 1925.  
R. M. McGEE  
1,566,335

COIN HANDLING MACHINE

Filed June 5, 1919     21 Sheets-Sheet 13

Inventor  
Richard M. McGee  
By his Attorneys  
Kenyon & Kenyon

Dec. 22, 1925.  1,566,335
R. M. McGEE
COIN HANDLING MACHINE
Filed June 5, 1919   21 Sheets-Sheet 14

Inventor
Richmond M. McGee
By his Attorneys
Kenyon & Kenyon

Dec. 22, 1925.

R. M. McGEE 1,566,335

COIN HANDLING MACHINE

Filed June 5, 1919  21 Sheets-Sheet 15

Inventor
Richmond M. McGee
By his Attorneys
Kenyon & Kenyon

Dec. 22, 1925.

R. M. McGEE 1,566,335

COIN HANDLING MACHINE

Filed June 5, 1919   21 Sheets-Sheet 16

Inventor
Richmond M. McGee
By his Attorneys
Kenyon & Kenyon

Dec. 22, 1925

R. M. McGEE 1,566,335

COIN HANDLING MACHINE

Filed June 5, 1919  21 Sheets-Sheet 17

Inventor
Richmond M McGee,
By his Attorneys
Kenyon & Kenyon

Dec. 22, 1925.  1,566,335
R. M. McGEE
COIN HANDLING MACHINE
Filed June 5, 1919  21 Sheets-Sheet 18

INVENTOR.
Richmond M. McGee,
BY
Kenyon & Kenyon
his ATTORNEYS

Dec. 22, 1925.  1,566,335
R. M. McGEE
COIN HANDLING MACHINE
Filed June 5, 1919   21 Sheets-Sheet 19
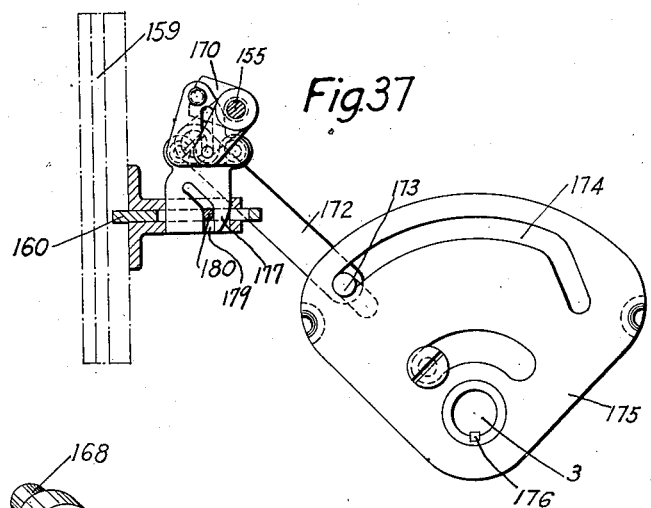
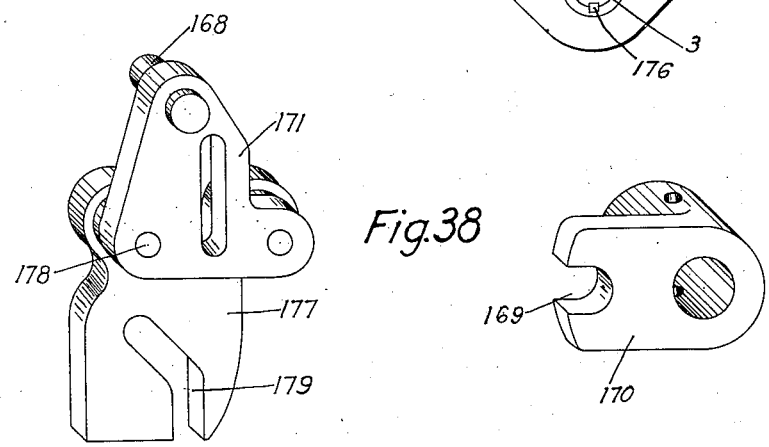
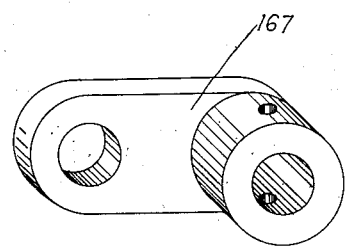
INVENTOR.
Richmond M. McGee,
BY
Kenyon & Kenyon
his ATTORNEYS.

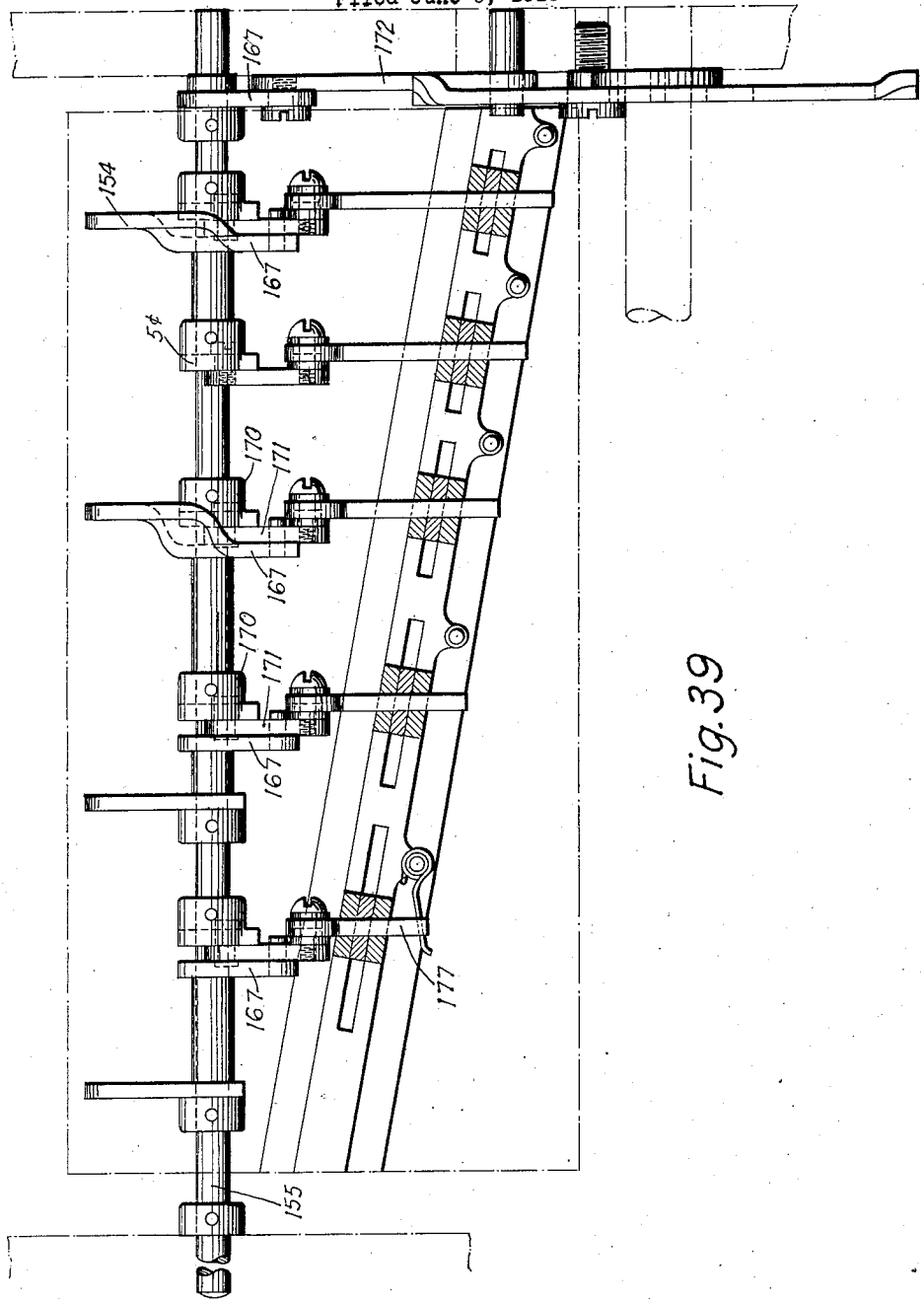

Dec. 22, 1925.  
R. M. McGEE  
1,566,335  
COIN HANDLING MACHINE  
Filed June 5, 1919  
21 Sheets-Sheet 21

Inventor  
Richmond M. McGee,  
By his Attorneys  
Kenyon & Kenyon.

Patented Dec. 22, 1925.

1,566,335

UNITED STATES PATENT OFFICE.

RICHMOND M. McGEE, OF NEW YORK, N. Y., ASSIGNOR, BY MESNE ASSIGNMENTS, TO AMERICAN AUTOCASHIER CO., INC., A CORPORATION OF DELAWARE.

COIN-HANDLING MACHINE.

Application filed June 5, 1919. Serial No. 302,021.

*To all whom it may concern:*

Be it known that I, RICHMOND M. McGEE, a citizen of the United States, and a resident of the city, county, and State of New York, and whose post-office address is 111 Broadway, have invented certain new and useful Improvements in Coin-Handling Machines, of which the following is a specification.

My invention relates to coin handling machines, and particularly to a changemaking machine wherein a certain part of the value of the coin tendered to the machine is returned as change, while the coin itself is retained. Another object of my invention is the production of a machine which retains any coin tendered and which may or may not return any part of the value of the coin, the returned value, if any, to be determined by the same set of designating keys regardless of the value of the coin tendered.

Another object of my invention is the production of a machine which can be set without removing or adding any part to retain a fixed amount automatically when a coin is tendered, or any multiple of that amount merely by the depressing of certain designation keys. Another object of my invention is the production of a double registering apparatus, one of which is open to the view of the operator and the other of which is secret. Another object of my invention is to provide a machine in which the unit amount retained may be changed without the addition or removal of parts. Another object of my invention is to simplify machines of this character and to eliminate the confusion resulting from a multiplicity of keys and to otherwise simplify the mechanical and electrical operating apparatus of machines of this character.

My machine is capable of various uses; in fact, it may be used at any place where it is desired to collect a fixed fare for any service rendered.

The machine hereinafter described is normally set so as to retain the whole value of a coin of the exact amount desired but to return any part of the value of the coin if the same exceed that amount, the operation consisting merely of pressing indicating keys, if the amount to be retained is a multiple of the required fare, the machine automatically upon the operation of said key, proceeding to deduct the desired number of fares and return the balance of the value of the coin in change.

Many modifications or changes in detail may be made in the carrying out of the principle of my invention, but I have annexed hereto certain drawings for the purof illustrating one embodiment of my invention and means by which the same may be carried out. These drawings form a part of this specification, in which Fig. 1 is a front elevation with the casing removed.

Figure 28:
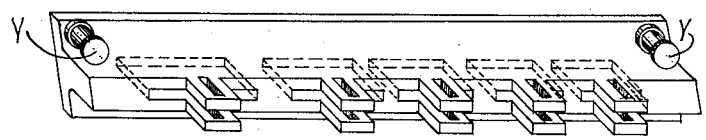
Figure 30:
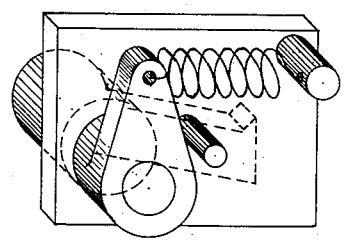
Figure 31:
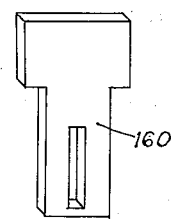
Figure 32:
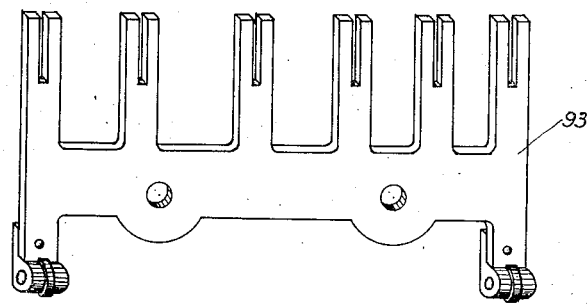

Fig. 28 likewise shows a casting.

Figure 29:
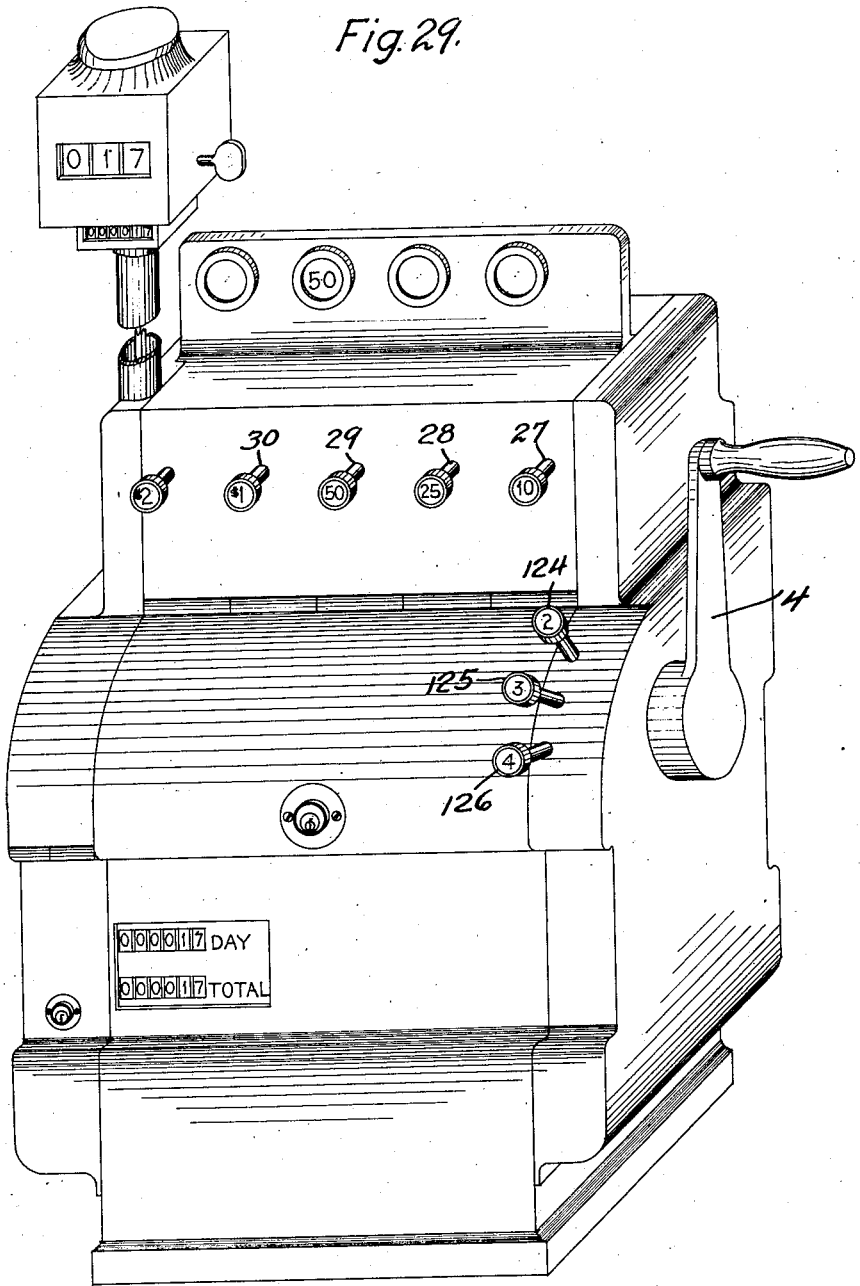

Fig. 29 shows an outside view of the machine with the casing applied, and also shows an outside view of the registering means.

Figs. 30, 31, 32, 33 and 34 show in perspective certain details.

Figure 35:
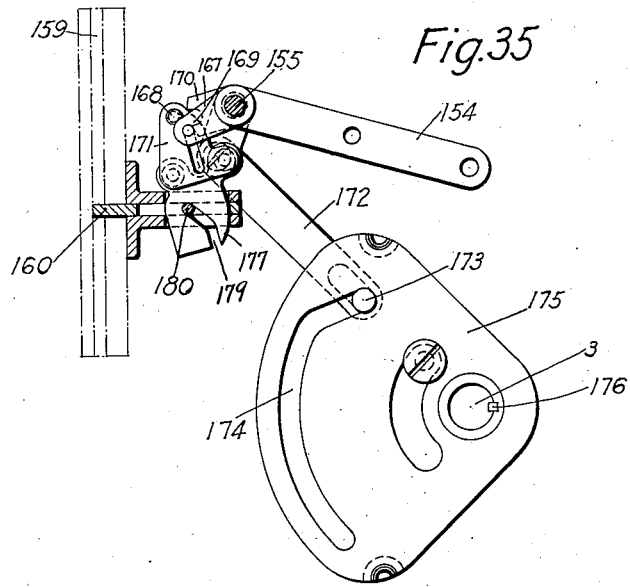
Figure 36:
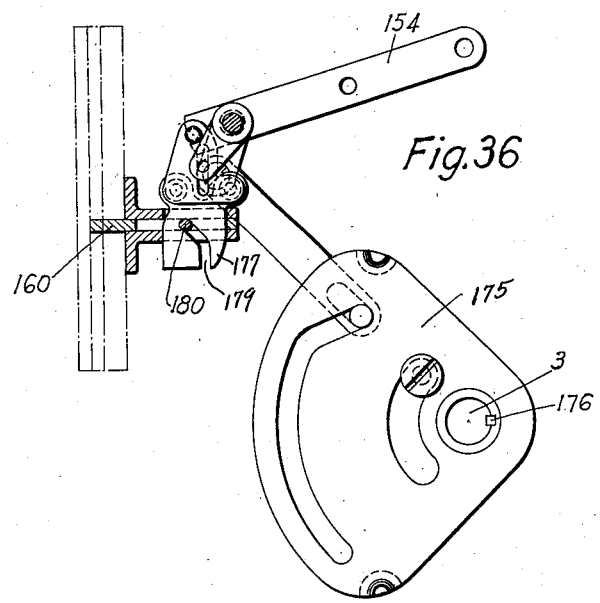

Figs. 35, 36 and 37 show means controlling the deposit of coin.

Fig. 38 shows some of the parts of Figs. 35—37 inclusive in detail.

Figure 6:
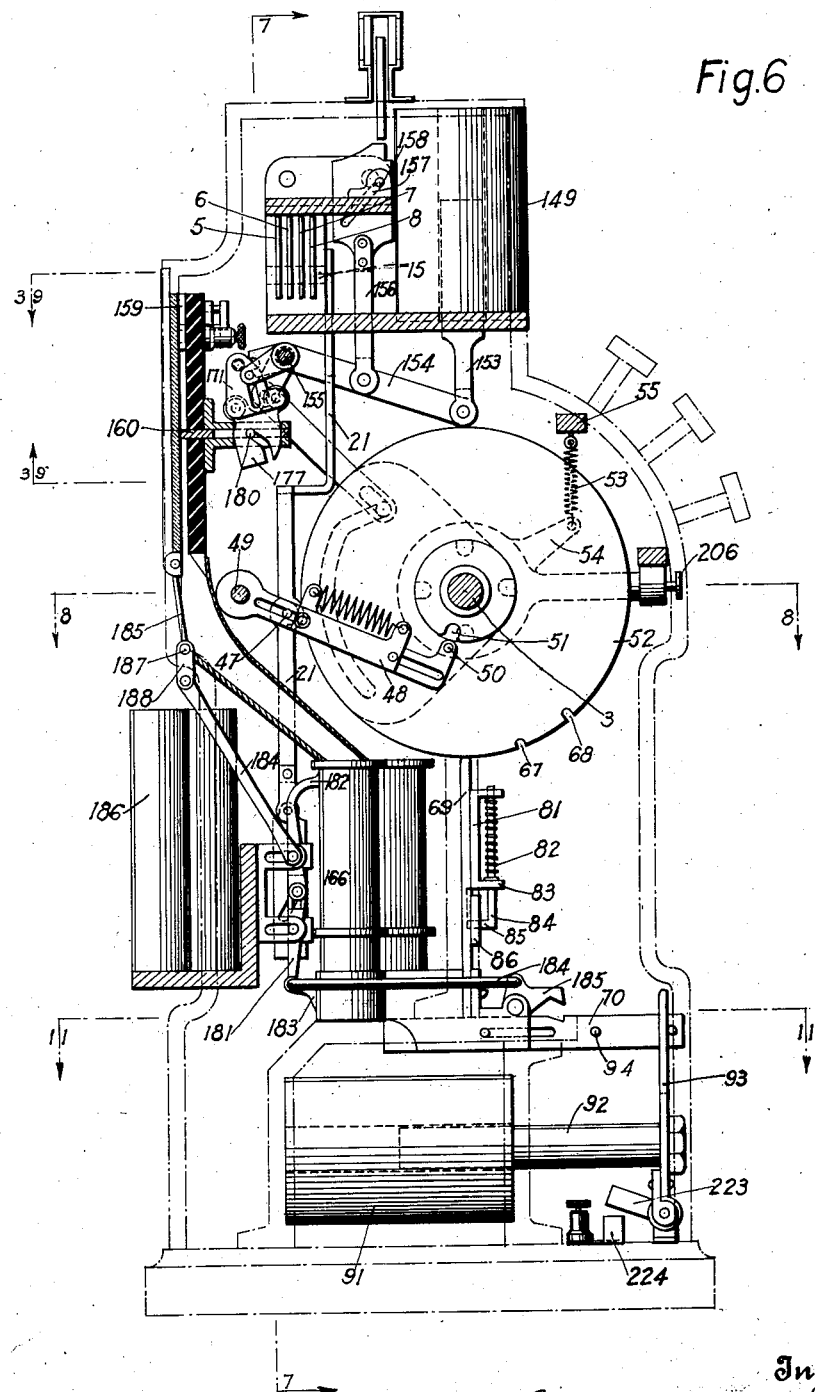
Fig. 6 is a sectional view on line 6—6 of Fig. 1.

Fig. 39 is a section along line 39—39 of Fig. 6.

Figure 40:
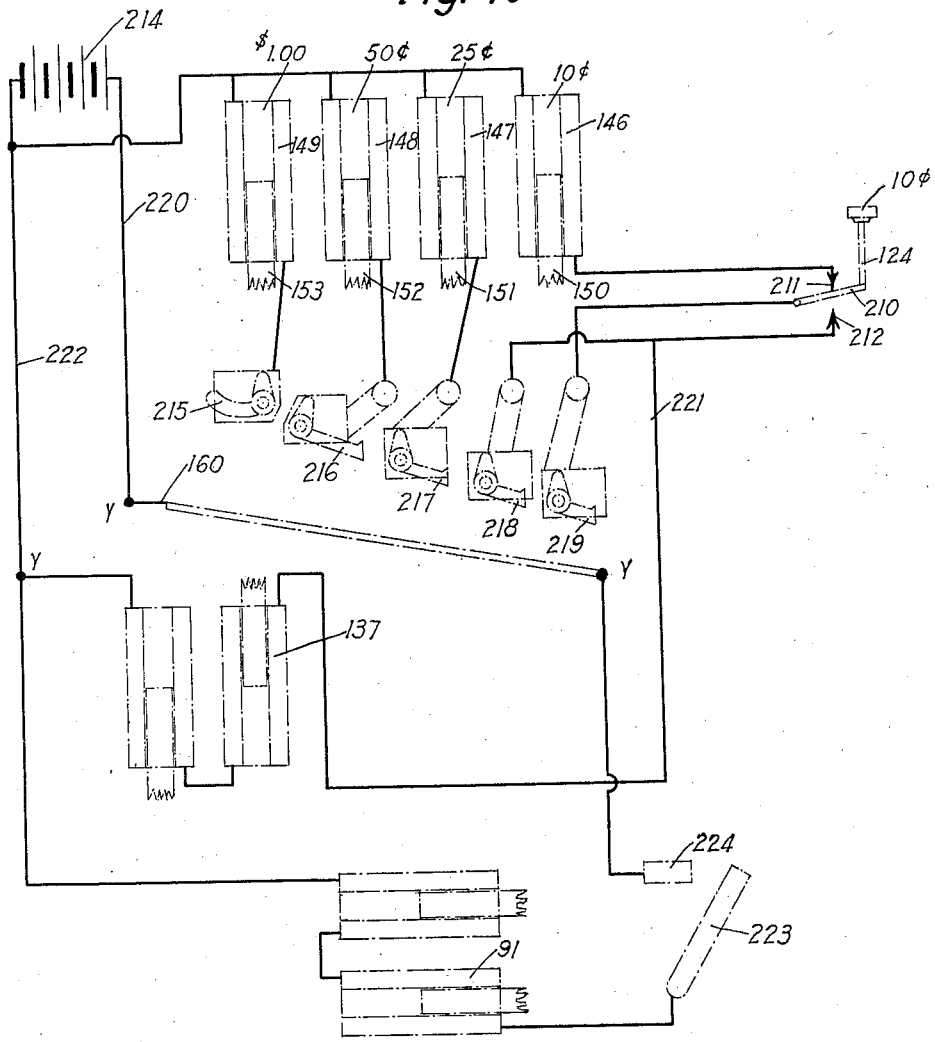

Fig. 40 shows a diagram of the electrical circuits, the same indicating the operating magnets diagrammatically.

Figure 1:
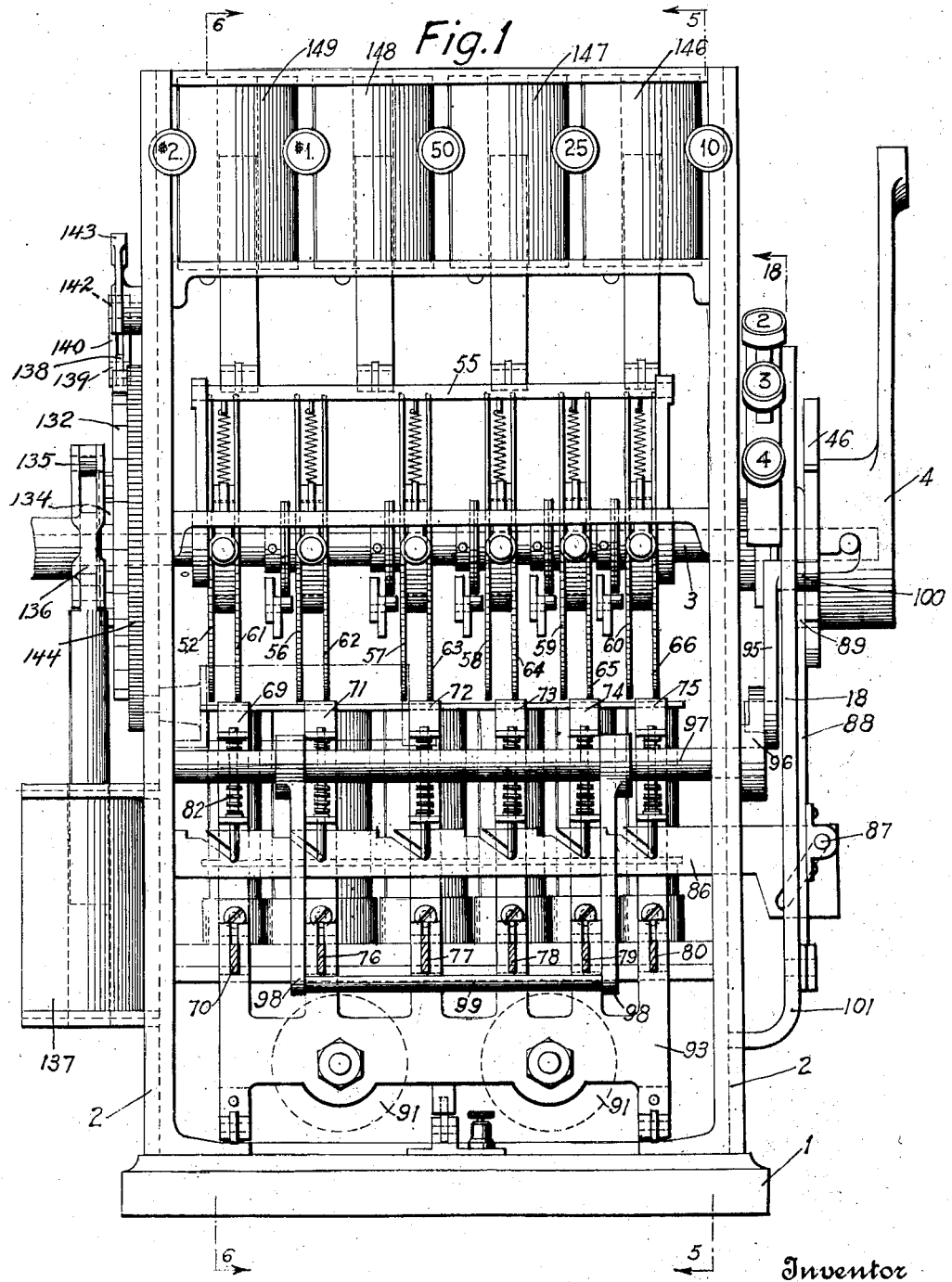
Figure 2:
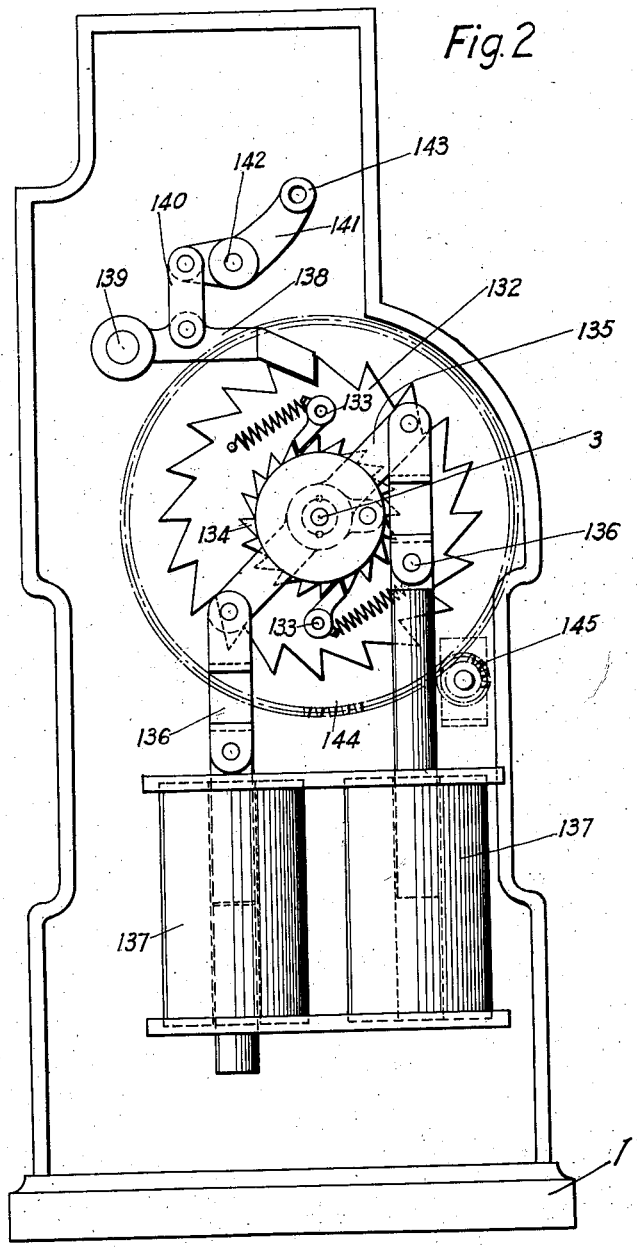
Fig. 2 is a side elevation with the casing removed, the same being the left side of the machine as seen in Fig. 1.
Figure 4:
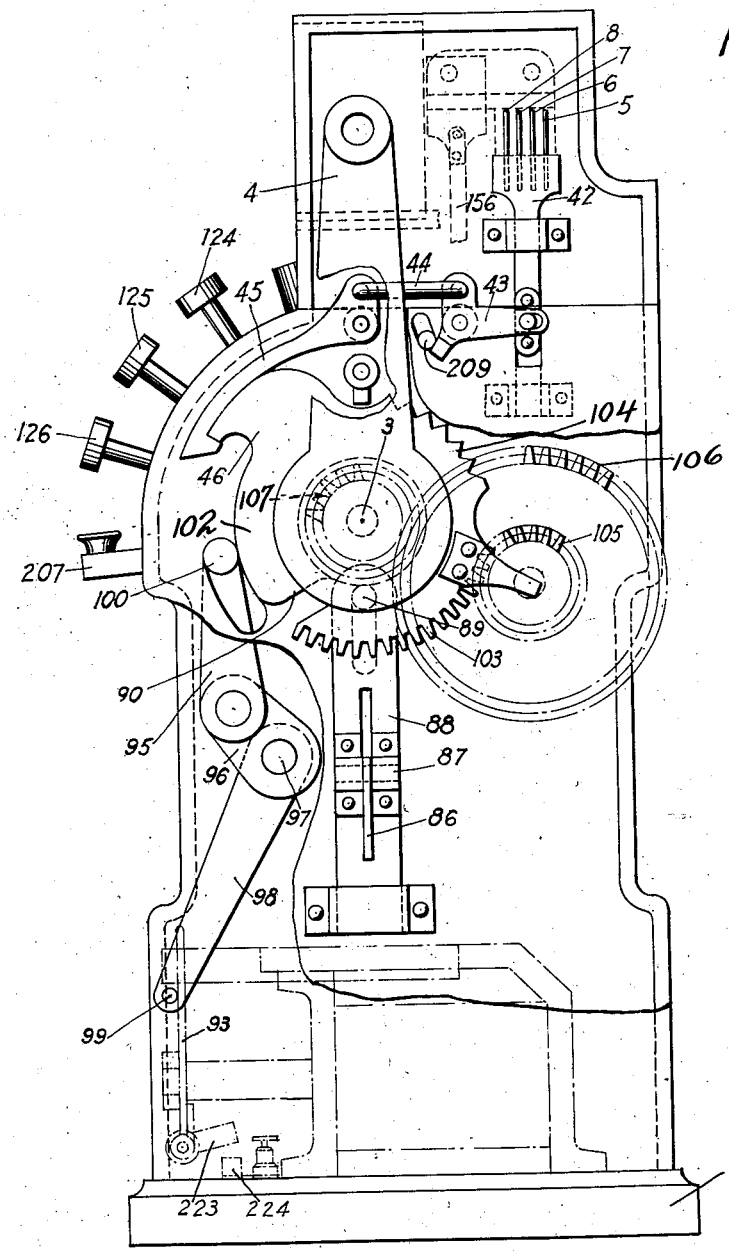
Fig. 4 is a side elevation with the casing removed looking at the machine from the side opposite to that of Fig. 2.
Figure 7:
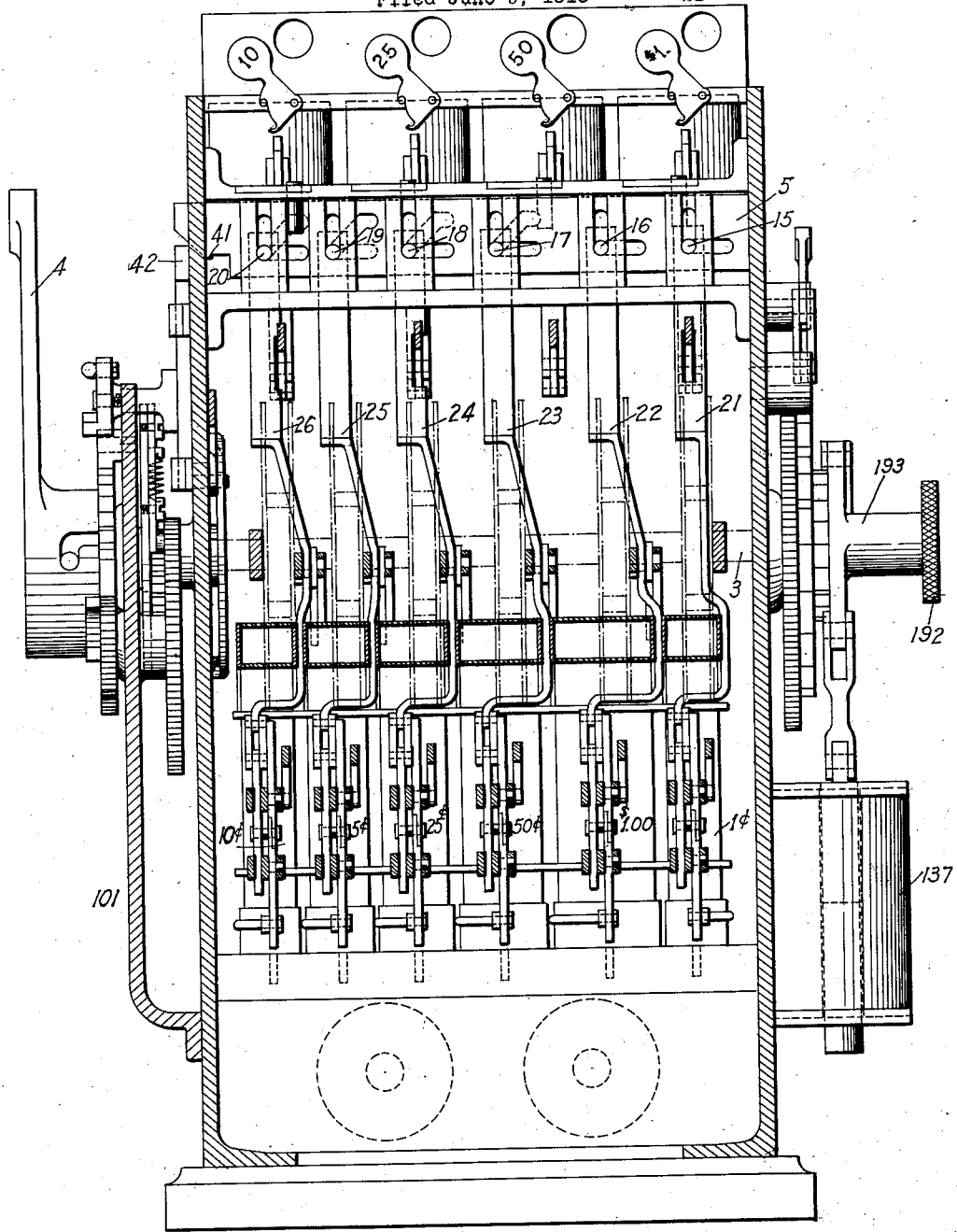
Fig. 7 is a view on line 7—7 of Fig. 6.

Referring to Figs. 1, 2 and 4, the machine comprises a base 1 and side frame members 2. Extending through the side members 2 is a shaft 3 on which is mounted a handle 4, which handle is not directly connected to the shaft. Also mounted parallel to the shaft 3 are four bars 5, 6, 7 and 8, (Fig. 4) these bars being shown in detail in Figs. 21, 22, 23 and 24; also in plan view in Fig. 17. Each of these bars has six slots, 9, 10, 11, 12, 13 and 14, either of L-shape or V-shape, for a purpose which will be described later. When the bars 5—8 inclusive are assembled, as shown in Figs. 6 and 7, the corresponding slots 9—14 are aligned, and through the corresponding slot of each bar extends a pin, 15, 16, 17, 18, 19 and 20 respectively. The pins 15—20 inclusive are attached to rods 21, 22, 23, 24, 25 and 26 respectively, which rods extend downwardly.

Figure 17:
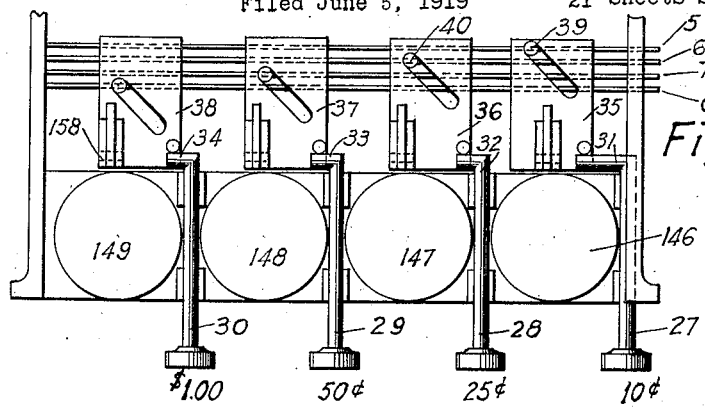
Fig. 17 is a view of the key operating mechanism.

By referring to Fig. 17, it will be noted that four keys 27, 28, 29 and 30 are provided, said keys bearing the symbol of ten cents; twenty-five cents; fifty cents and one dollar respectively. These keys have stem portions 31, 32, 33 and 34 respectively, which engage pins on slotted members 35, 36, 37 and 38. The member 35 has a slot in it which engages a pin 39 on the bar 5; likewise the member 36 has a slot in it which engages a pin 40 on the bar 6; likewise the member 37 has a slot in it engaging a pin on the bar 7, and the member 38 has a slot in it engaging a pin on the bar 8, so that when, for instance, the key 27 representing ten cents is pressed inwardly, the member 35 is pushed in the same direction, and by reason of the engagement of slot in member 35 with the pin 39 on the bar 5 the bar 5 is pushed to the right, as shown in Fig. 17.

Figure 9:
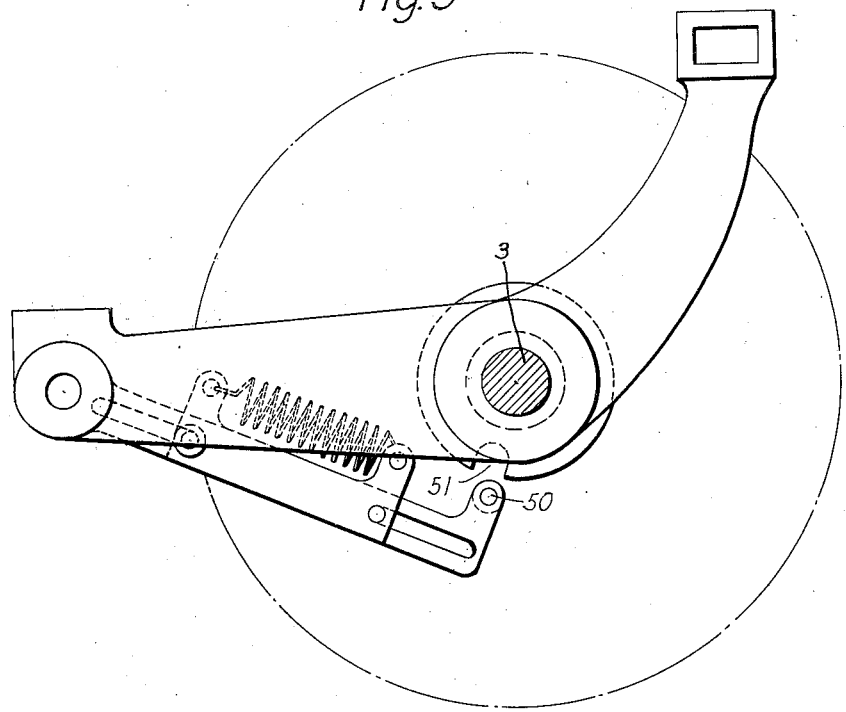
Fig. 9 is a sectional view on line 9—9 of Fig. 8.
Figure 33:
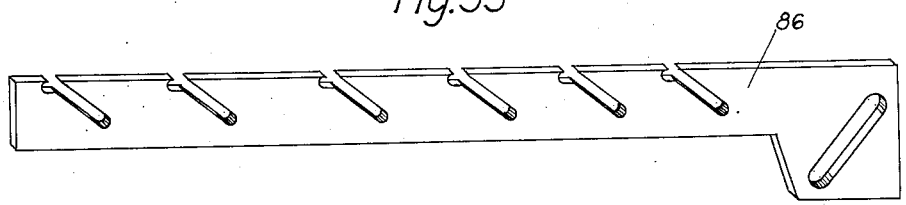

By referring to Figs. 21 to 24, it will be noted that the bars 5, 6, 7 and 8 each have a hook 41. In the case under consideration, when the bar 5 is moved to the right in Fig. 17, the hook 41 moves to the left as shown in Fig. 7, and the incline engages the member 42 and pushes it downwardly. When the hook 41 passes over beyond the edge of the member 42, the members are locked in position. By referring to Fig. 4 it will be seen that the member 42 in its downward movement operates one arm of the bell crank lever 43, to another arm of which is connected a link 44, which in turn is connected to a pawl 45, which engages with a projection 46 fastened to the handle 4 and unlocks the handle so that it is free to be moved at the proper time. Referring to Fig. 6, as the member 21 is moved upwardly by reason of the pin 15 engaging a slot in the member 5, for instance, a pin 47 engaging a slot in the member 48 which is pivoted at 49, causes the member 48 to move in a counterclockwise direction, thus bringing a projection 50 on the member 48 into a notch 51 in the selector disk 52. These parts are shown in detail in Figs. 9 and 10. This operation locks the selector disk 52 to the shaft 3, the same being permitted to rotate with the shaft by reason of the slot connection between the member 50 and the member 48. Normally the selector disk 52 is held in the position shown in Fig. 6 by means of the spring 53, which is fastened at one end to an arm 54 on the disk and at the other end to a fixed bar 55 running across the machine.

By reference to Fig. 1, it will be noted that there is a plurality of selector disks 52, 56, 57, 58, 59 and 60. These disks are shown in detail in Fig. 8. It will be noted that these disks are in duplicate, the duplicate for each of the above disks being 61, 62, 63, 64, 65 and 66 respectively. The purpose for this will appear presently.

It will be noted, by reference to Fig. 6, that the selector disk 52 is provided with two notches 67 and 68, 68 being deeper than 67. These notches are provided for the purpose of determining whether or not a coin shall be ejected, and if so, how many, the number of coins depending upon the depth of the notches. Arranged to enter the notches is a member 69 which is connected with the ejector bar 70. Referring to Fig. 1, it will be noted also that the members 71, 72, 73, 74 and 75 are arranged to enter notches in the disks 62, 63, 64, 65, and 66 respectively, and that these member 71—75 are connected with the ejector bars 76, 77, 78, 79 and 80 respectively. The member 69 has a bracket 81 thereon against which bears the upper end of a coil spring 82 tending, when the spring is under compression, to move the bracket together with the member 69 and ejector bar 70 upwardly. Projecting downwardly from the bracket 81 and through the out-turned end 83 thereof loosely is a member 84 which is arranged to engage the lower end of the spring 82. The member 84 has an inturned end 85 which enters a slot in a sliding bar 86, best seen in Fig. 1.

When this bar 86 is moved to the right in Fig. 1, all of the members 84, that is, one for each set of the selector disks moves upwardly so as to put the springs 82 under compression thereby moving the members 69, 71—75 inclusive together with the ejector bars upwardly, provided the member 69 &c is opposite a notch corresponding, for instance, to the notch 67 in the selector disk 52. This construction is exactly the same for all of the selector disks and therefore, a description of all is not necessary.

Figure 5:
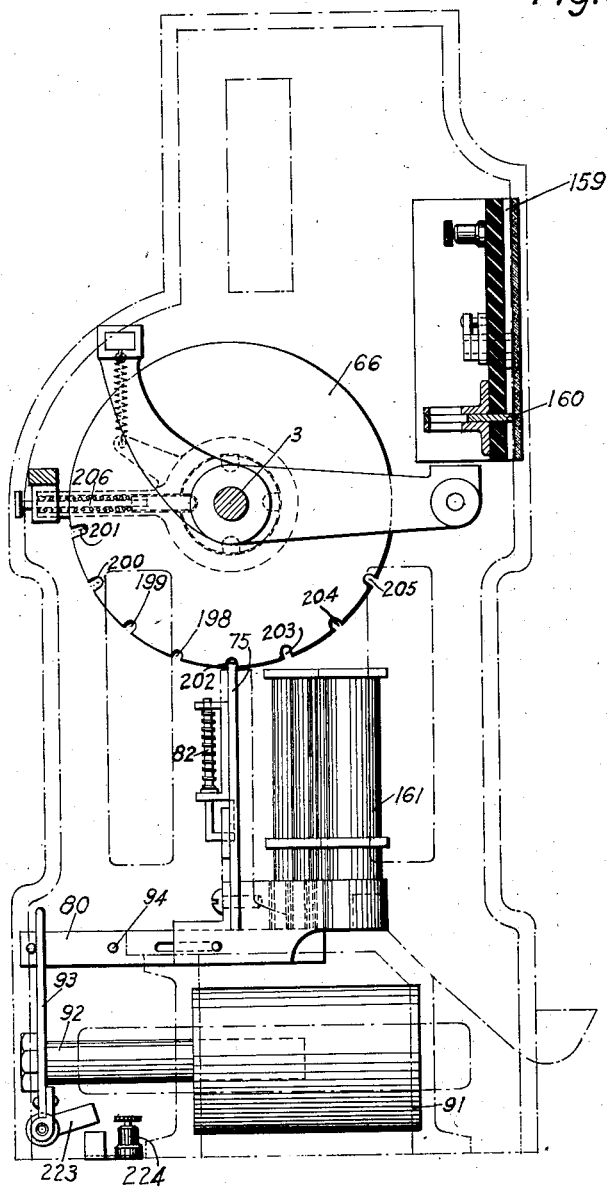
Fig. 5 is a section on line 5—5 of Fig. 1.
Figure 20:
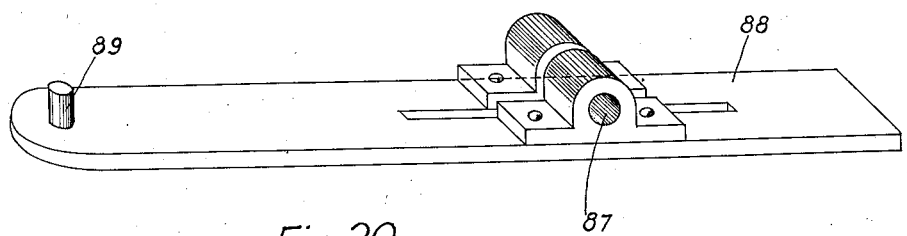
Fig. 20 shows a detail.
Figure 12:
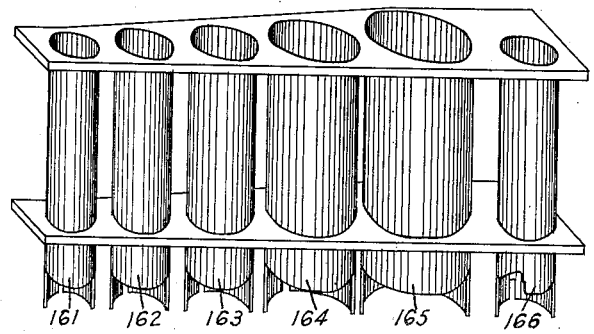
Fig. 12 is a perspective view of the coin receptacles.
Figure 13:
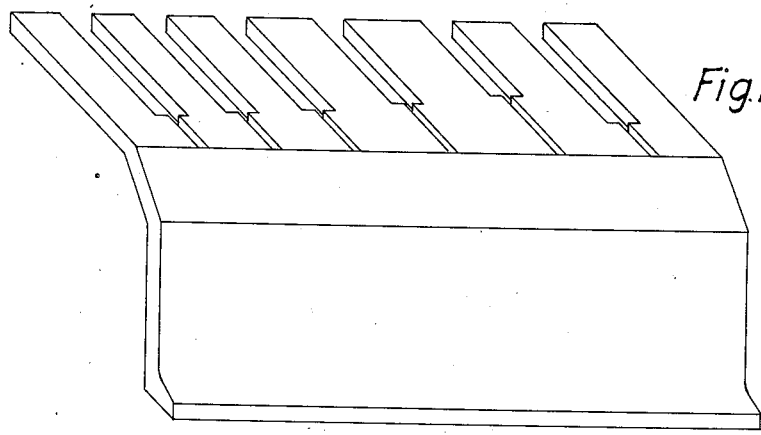
Fig. 13 is a perspective view of the base casting.
Figure 14:
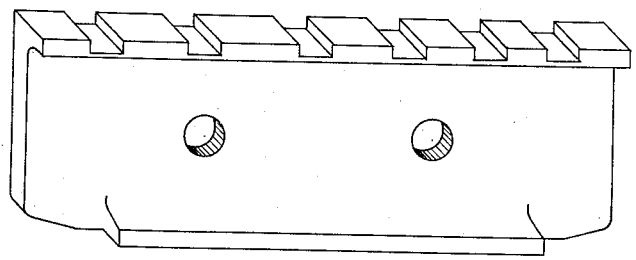
Fig. 14 is a perspective view of another of the machine castings.
Figure 15:
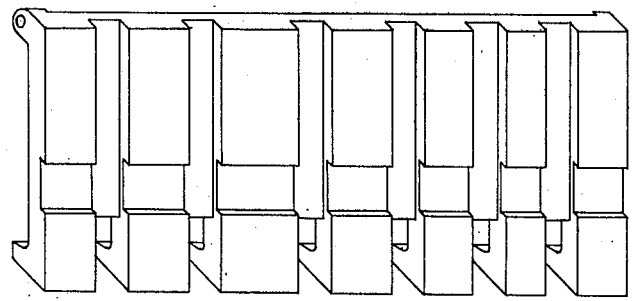
Fig. 15 is a perspective view of another of the castings.
Figure 16:
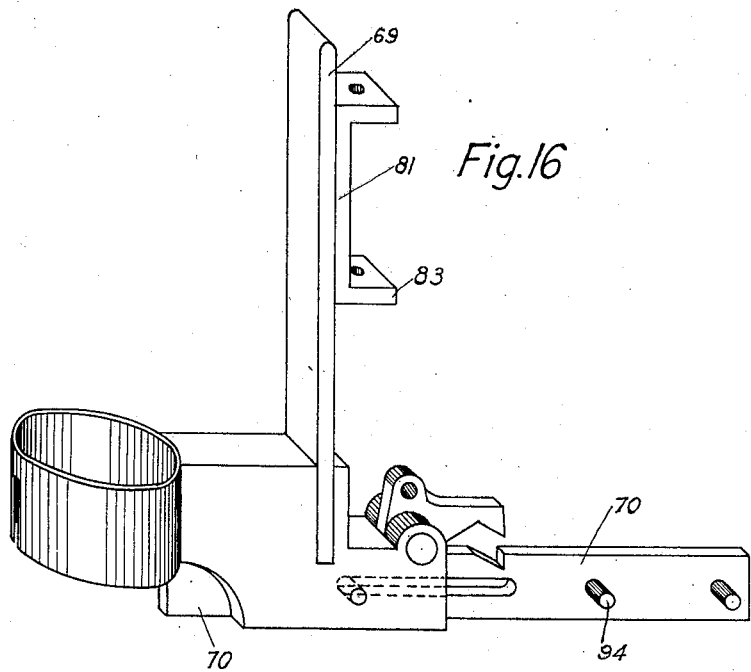
Fig. 16 is a perspective view of part of the ejecting apparatus.

The bar 86 is moved to the right (Fig. 1) by means of pin 87 engaging a slot in the right-hand end of the bar 86. This pin 87 is connected to a member 88, shown in detail in Fig. 20. The bar 86 is shown in detail in Fig. 33. The member 88 has thereon a pin 89, which engages a cam surface 90 rigidly connected with the handle 4 as seen in Fig. 4, and when the handle 4 is moved in a counter-clockwise direction, the cam surface 90 engages the pin 89 and moves the member 88 downwardly, whereupon the pin 87 engaging the slot in the member 86 moves that member to the right and puts all of the springs 82 under compression. It will be noted that by reason of the engagement of the cam surface 90 and means presently to be described, the springs 82 will not be placed under compression until after the desired selector disks have been moved to the proper position, so that the members 69 or 71—75 inclusive may engage the notches 67 or 68 as the case may be in the proper selector disks. Ordinarily the ejector bars 70 and 76—80 inclusive are operated by means of the ejector magnets 91. This is accomplished by the armature 92 of the magnet pulling a member 93 against a pin 94 extending through the ejector bars, as shown in Fig. 5. If, however, there is no current available for operating the magnets, or if, for any reason, it is desired not to operate them electrically, the mechanism shown in Fig. 4 is effective for operating the ejectors. This consists of a member 95 which is pivoted to the member 96, which is rigidly connected to a shaft 97 journaled in the frame members 2 (as seen in Fig. 1) and rigidly connected with another member 98. A member 99 is also connected to the shaft 97 as seen in Fig. 1, and engages the member 93 and acts mechanically to move the member 93 to the same extent and in the same manner, although somewhat more slowly, as does the electromagnet 91 when energized. The members 95, 96 and 98 are operated by means of the projection 46 engaging a member 100, thereby rocking the shaft 97 to which the members 98 are rigidly connected.

Figure 8:
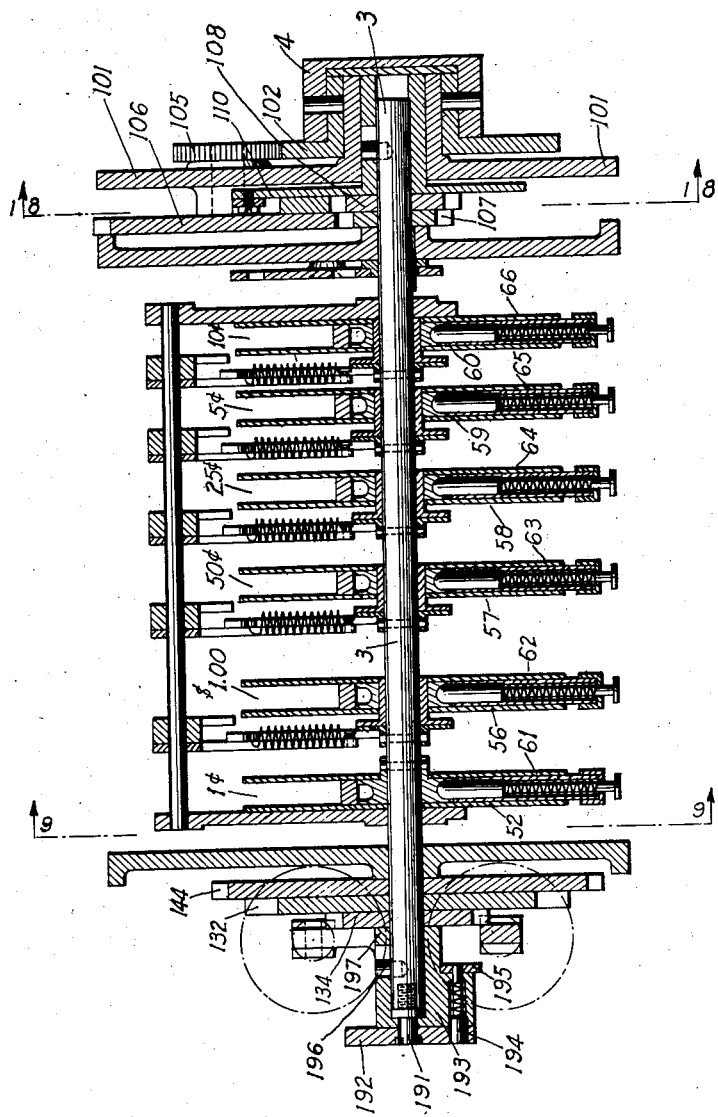
Fig. 8 is a sectional view on line 8—8 of Fig. 6.
Figure 18:
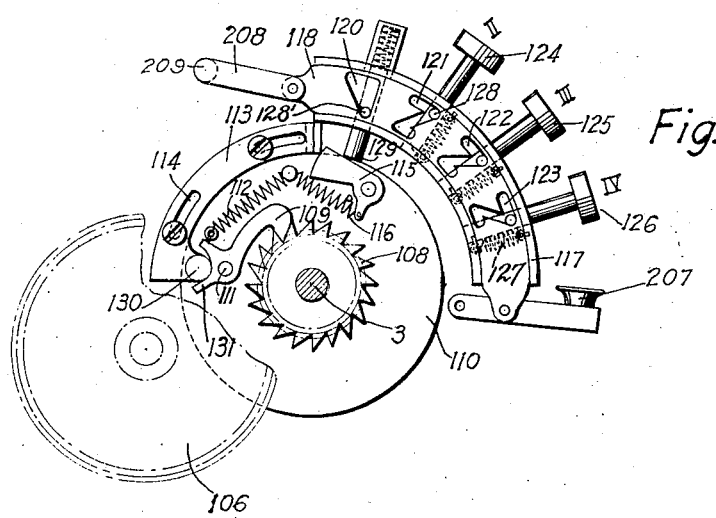
Fig. 18 is a view of the key operating mechanism for designating the number of fares to be retained by the machine.

It is desired that the shaft 3 on which are mounted the selector disks, shall move more rapidly than does the handle 4; therefore, the handle is connected to the shaft 3 through a system of speed-up gearing. The mechanism about to be described is supported partially by a frame member 101, as seen in Fig. 1. A section of these parts is shown in Fig. 8, from which it will be seen that the handle 4 is connected to a member 102, which, as seen in Fig. 4, comprises a gear sector 103 and also the cam surface 90 and the projection 46, together with a serrated sector 104, the purpose of which will be described later. The gear sector 103 engages with a gear wheel 105 which is journaled in the member 101 and on the other end of the shaft of which is placed a gear 106, which in turn engages a gear 107, which is rigidly connected to the shaft 3 through the disk 110. A pawl 109 on the disk 110 is normally rigidly connected with the shaft 3, as shown in Fig. 18. The pawl 109 is pivoted at 111 to the disk 110 and is biased into engaging position with the ratchet 108 by means of a spring 112. Mounted on the periphery of the disk 110 is an arcuate member 113 which has a pin and slot connection with the disk 110 so as to permit of a movement with respect to the disk a distance equal to the length of the slot 114. Also mounted on the disk 110 is a second pawl 115 held in the position shown, by means of a spring 116. Mounted adjacent the disk 110 and concentric therewith is a member 117 (Fig. 18) shown in section in Fig. 19. Mounted in the member 117 is a slidable member 118 having slots 120, 121, 122, 123 therein. Arranged to extend through one side of the member 117 are three keys 124, 125 and 126. These keys are held in the position shown by coil springs 127. Each of the keys is provided with a pin 128.

There is also a member 129 normally occupying the position shown in Fig. 18, the same, however, having a pin 128' arranged to operate in the slot 120.

In operation, when the handle 4 is moved, it in turn moves the gear wheels 105, 106 and 107 and the ratchet 108 which is rigidly connected to the gear 107, and when the pawl 109 is in engagement with the wheel 108, the disk 110 with the sector 113 together with the shaft 3 move in a clockwise direction, as shown in Fig. 18. This movement continues until the member 113 strikes the pin 129, whereupon the disk 110 and the shaft 3 continues to rotate, whereas the sector is stopped in its movement by the pin 129. This causes the pin 130 to engage the projection 131 on the end of the pawl 109 and remove the pawl 109 from the ratchet 108. During this time the ratchet 115 is just approaching the right-hand edge of the pin 129, and just prior to the release of the pawl 109 from the ratchet 108, the pawl 115 snaps behind the pin 129 so as to hold the disk 110 in position. During this movement the selector disks 52—66 are moved the required distance and upon the release of the pawl 109 from the ratchet 108, the shaft 3 together with the disk 110 stops rotation, but the handle 4 continues to move so that the cam surface 90 engages the pin 89 to set the springs 82 under tension, which in turn causes the ejector member to be placed in the proper position to eject the desired coins. The handle continuing in its movement, causes the mechanical operation of the ejector through the members 95, 96, 97, 98, 99 and 100 as heretofore explained.

Figure 19:
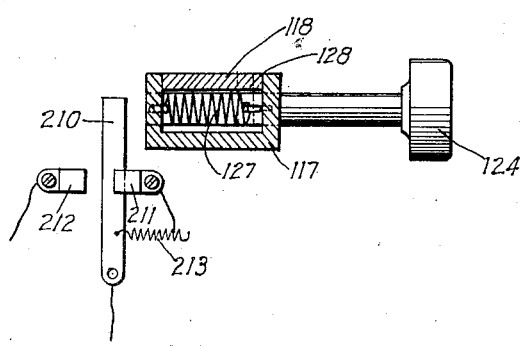
Fig. 19 is a detail view of one of the operating keys.
Figure 21:
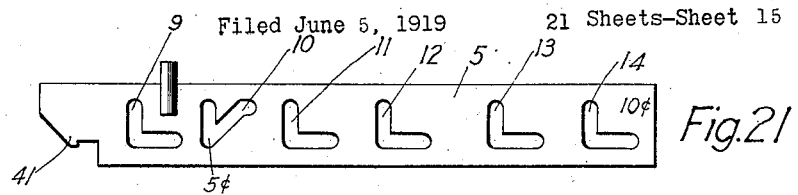
Figs. 21, 22, 23 and 24 show the lay-out of the denomination bars.
Figure 22:
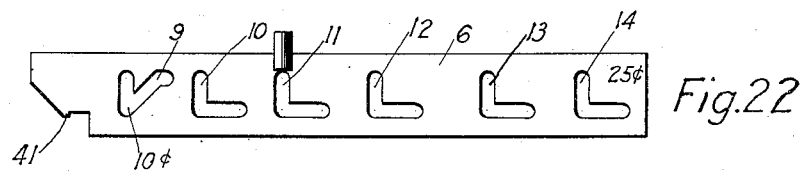
Figure 23:
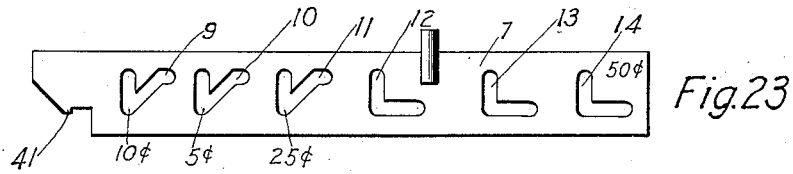
Figure 24:
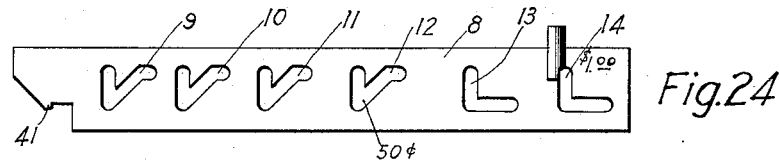
Figure 25:
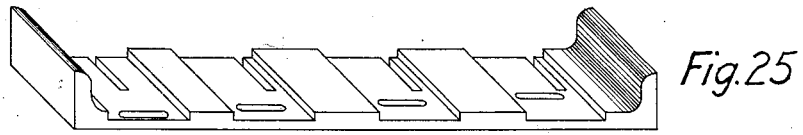
Figs. 25, 26 and 27 show details in perspective of certain castings cooperating with the denomination bars.
Figure 26:
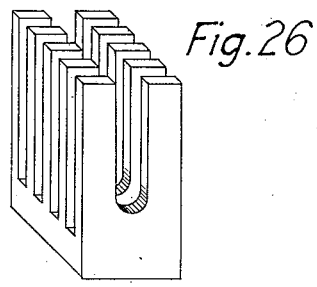
Figure 27:
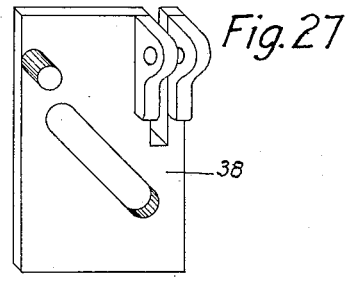

By reason of the arrangement shown in Figs. 18 and 19 when either of the keys 124, 125, 126 is pressed, the member 118 is moved in a clockwise direction and that causes the pin 128', by reason of the engagement with the slot 120, to raise the projection 129 up. On the other hand, as a key, for instance 124, is pressed inwardly, it projects down into proximity to the periphery of the disk 110 and by reason of the formation of the slot 121, it is held in a depressed position so that upon the movement of the handle 4, exactly the same operation as above described will take place, except the sector 113 will move to a point so that it engages with the stem of the key 124 instead of with the pin 129; therefore, the selector disks which are mounted on the shaft 3 will move a correspondingly different distance. The member 129 is in operation when only one fare is to be extracted from the coin deposited, whereas the key 124 is pressed when two fares are to be taken; likewise 125 is to be operated when three fares are taken, and 126 when four fares are to be taken; and it is the difference in angular rotation, as caused by different positions of the keys 124, 125, and 126, which determines the amount of change to be returned to the customers from the coin deposited. It sometimes happens that in operating the keys to designate the number of fares to be retained a mistake is made, in which event it is desired to correct the same, and this may be accomplished by a correction key 207 which when pressed outwardly as shown in Fig. 18 moves the selector 118 outwardly to release the pin 128 from the slot 121, for instance, so that the key of the pin being thus released will fly upwardly before the machine has been operated. In order to provide against the keys sticking after the operation of the machine, a member 208 is attached to the member 118 as shown in Fig. 18 and a pin 209 extending laterally from the member 208, the head of which is seen in Fig. 4, is provided and projects through the machine and is arranged to be engaged by the member 43 so as to positively disconnect any of the keys from their slots upon the completion of the operation of the machine.

As shown in Fig. 19, the key 124 which represents two fares is arranged when operated to move a switch 210 out, say, from contact 211 into engagement with 212. The significance of this operation will appear later. The switch 210 is normally held in the position shown by a coil spring 213.

Mounted on the left-hand end of the side of the machine, a view of which is shown in Fig. 2, is the registering mechanism. This consists of a ratchet 132 which is mounted on the shaft 3 and rotates therewith. Mounted on the ratchet 132 are two pawls 133 which engage a second ratchet 134 also mounted on the shaft 3. Attached to the shaft 3 is a lever 135 to the ends of which are attached the cores 136 of solenoids 137, the position of the cores being normally that shown in Fig. 2. Arranged to cooperate with the teeth of the ratchet 132 is a pawl 138 which is pivoted at 139, and to it is connected intermediate its ends a member 140, which is pivotally connected to a member 141, which is pivoted at 142 to the casing of the machine. The end 143 of the member 141 is arranged to be connected to any suitable oscillating registering device such as that ordinarily used on street cars. Mounted on the shaft 3 to rotate therewith is a gear wheel 144 which cooperates with a similar gear wheel 145, which operates a secret register not open to the view or probably not within the knowledge of the operator of the car or other device on which this machine is placed.

The solenoids 137 are arranged to operate automatically upon the deposit of a coin representing in value the fare to be paid and the operation of the magnets 137 causes the shaft 3 to rotate to register the fare without the necessity of the operation of the handle 4. The circuit by which the magnets are operated is shown in Fig. 40 which circuits will be traced in detail hereinafter.

I will next describe the means by the operation of which the coin tendered is transmitted to the coin receptacle of the instrument. Special reference should be made to Figs. 6 and 35 to 38 inclusive. Each time a coin is deposited, a corresponding magnet 146, 147, 148 or 149 is operated, as will be apparent by reference to Fig. 40. The coil energized depends upon the size of the coin deposited as, for instance, the coil 146 is energized upon the deposit of a ten-cent piece, coil 147 upon the deposit of a twenty-five cent piece, coil 148 upon the deposit of a fifty-cent piece and coil 149 upon the deposit of a silver dollar. Upon the energization of any of the coils 146 to 149, its core 150, 151, 152 or 153, respectively, are moved upwardly as shown in Fig. 6; assuming coil 149 to have been energized, it moves a lever 154 in a counter-clockwise direction around the shaft 155 as shown in detail in Figs. 35 and 36. Upon the upward movement of the lever 154 around its axis a member 156 is pushed upwardly and by reason of a cam slot 157 therein engaging a pin 158 mounted on member 38 as shown in Fig. 17, the said member 38 is moved upwardly as shown in Fig. 17 to cause the bar 8 to be moved to the right as already explained. The operation of the bars 5, 6, 7 and 8 by their respective magnets 146, 147, 148 and 149 respectively is the same as the operation by means of the keys 27, 28, 29 and 30, the difference being that in one case the operation is electrical whereas in the other it is mechanical.

Figure 3:
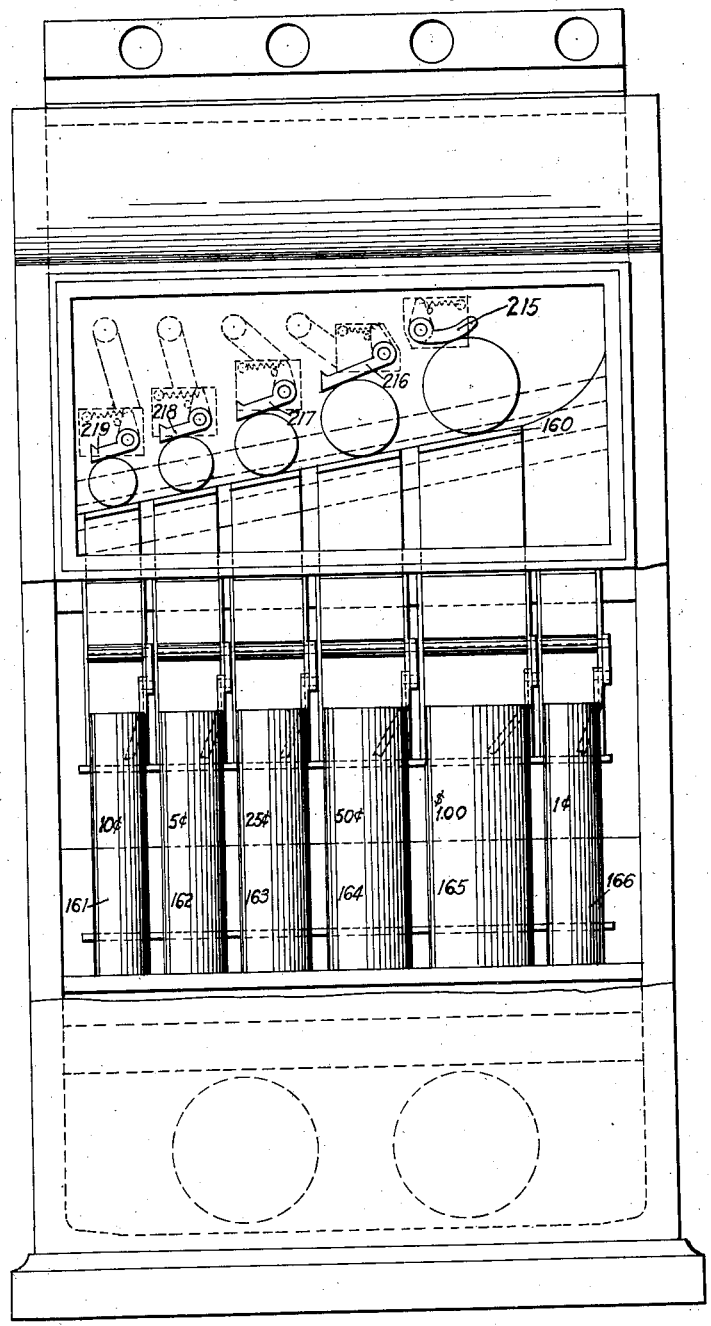
Fig. 3 is a rear elevation with the casing removed.

When a coin is deposited in the slot 159, as shown in Figs. 5 and 6, the same is arrested in its downward movement by means of a member 160. These parts are shown in detail in Figs. 35, 36 and 37. It is desired that the coin be held in position on the member 160 until the operator of the car or other device to which the machine is attached has an opportunity to inspect the same, whereupon the proper keys are pressed to deduct the one or more fares therefrom, whereupon it is desired that the deposited coin then be transmitted to a suitable coin receptacle 161, 162, 163, 164 or 166, as shown in Fig. 3 and Fig. 6. This is accomplished by the following means, reference being had to Figs. 35 to 38 inclusive: When the member 154 is moved in a counter-clockwise direction, the projection 167 normally having the position shown in Fig. 35 is moved also in a counterclockwise direction being rigidly connected with a member 154. This brings the parts to the position shown in Fig. 36, wherein the pin 168 is opposite slot 169 in the member 170 which member 170 is rigidly connected to the shaft 155. The member 171 is connected with a lever 172 which operates through a pin 173 in a cam slot 174 and a member 175 keyed to the shaft 3 by means of the key 176. The member 171 is also pivotally connected to the member 154 by a pin 178 (Fig. 38). The member 177 has a cam slot 179 therein in which slot is placed a pin 180 which is connected with the member 160, so that by means of the mechanism above described when the lever 154 is raised by its electromagnet the net result is that the parts are brought to the position shown in Fig. 36. At that time either the electro-magnets 137 or the handle 4 will cause the member 175 to be rotated in a clockwise direction whereby the cam slot 174 acting on the member 172 cause the parts to take the position shown in Fig. 37, so that the cam slot 179 in the member 177 engaging with the pin 180 in the member 160 causes the member 160 to be pushed to the right as shown in Fig. 37 thereby freeing the slot 159 and allowing the coin to pass through into the proper receptacle.

Figure 34:
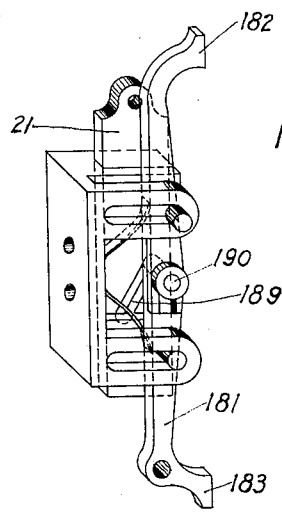
Figure 11:
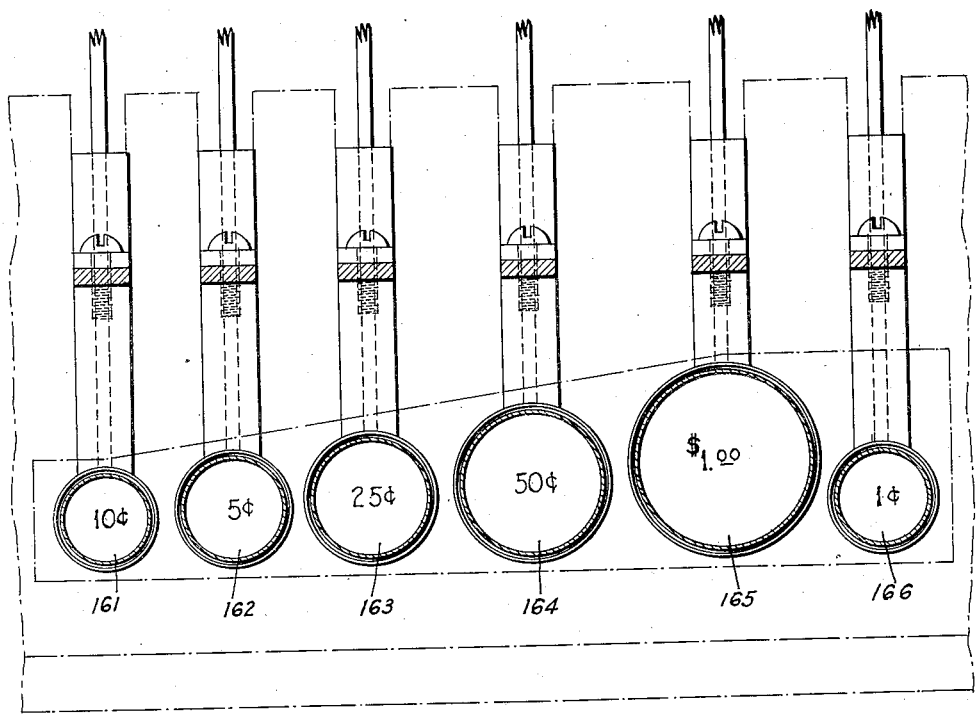
Fig. 11 is a sectional view on line 11—11 of Fig. 6.

Means are shown in Figs. 6 and 34 for giving a signal when the coin receptacle is too full or when the same is substantially empty. This mechanism comprises a member 181 having one end 182 arranged near the top of the coin receptacle as shown in Fig. 6, and the other end 183 arranged near the bottom of the coin receptacle. Connected near the lower end of member 181 is a rod 184 connected to a dog 185, which by reason of its connection with member 184 is held out of a notch in the ejector member 70. If the receptacle 166, for instance, becomes substantially empty and the coins pass down below the end 183, the member 181 will move to the right thereby permitting the dog 185 to fall into the notch 170 to prevent operation of the ejector mechanism. If the coin receptacle becomes filled, the end 182 of the member 181 will engage the edge of the coins which will hold the same to the position somewhat to the left of that shown in Fig. 6. When the member is in such a position, the member 184, which is pivotally connected to the member 181, operates a door 185' in the coin chute so as to deflect the coin from its normal path into a reserve container 186. This door is pivoted at 187 and is pivotally connected with the member 184 by a crank 188, so that as the upper end of the member 181 moves to the left, the door is rotated in a clockwise direction around the pivotal pin 187 so as to deflect the coin from the receptacle 166, say, to receptacle 186. The member 181 is connected with the operating member 21 so that as the member 21 is moved upwardly as hereinbefore explained the slot 189 engages the pin 190 and moves the member 181 outwardly or to the left. Normally, however, the end 182 moves back to the right in time to close the door 185' so that the coin will go into its proper receptacle unless the receptacle is already filled, in which case it is diverted as above described.

As above described, and with special reference to Fig. 1, it will be noted that the selector disks 61 to 66 inclusive are positioned so as to be engaged by the members 69 and 71 to 75 inclusive upon the operation of the corresponding ejector bar so that the position of the ejector bar is controlled by those disks.

The selector disks 56 and 62 are duplicates of each other and so are the disks 57 and 63, also disks 58 and 64, also disks 59 and 65, also 60 and 66, but the disks 52 and 61 are not duplicates. Disk 61 is arranged as a penny disk whereas the disk 52 is blank, that is to say, it has no notches in its periphery but is used as will be presently explained to render the penny disk ineffective. The means whereby this is carried out are as follows:

Referring to Fig. 8, the shaft 3 which carries all of the selector disks has in one end a screw-threaded hole into which is threaded a screw 191. This screw is fastened in a knurled head 192. Normally, the head 192 and the member 193 are held relatively fixed by means of the spring-pressed pin 194, so that there is no tendency for the screw 191 to rotate in the shaft 3. If it is desired to render the penny disk ineffective, the pin 194 is moved to the right in Fig. 8 by pushing the member 195 which is connected with the pin to the right. This withdraws the pin 194 from the hole in the head 192 so that the head may rotate independently of the shaft 3. The head is rotated in the proper direction to cause the shaft 3 as a whole to move to the right carrying with it all of the selector disks. When the shaft is moved to the proper point, a projection 196 which is fastened to the shaft strikes an abutment 197 on the member 193. At that time the hole in the head 192 registers with the pin 194 which snaps into the position shown in Fig. 8 to lock the parts together. By the movement of the shaft and the selector disks to the right as shown in Fig. 1 it will be found that the disk 52 will at that time be opposite the member 69. And the disk 61 will be moved to the right of the member 69 so that these two members do not engage each other. It therefore follows that the member 69 will at all times be held down as there are no notches in the disk 52. All of the other pairs of disks being duplicates, their movement so that the lefthand disks are opposite the ejector members instead of the righthand disks will not in any way interfere with their function. Any other suitable arrangement may be provided for shifting the member 69 into disk 52 instead of into disk 61 and the other ejector members 71 to 75 inclusive may be arranged to operate on the same or duplicate disk.

Figure 10:
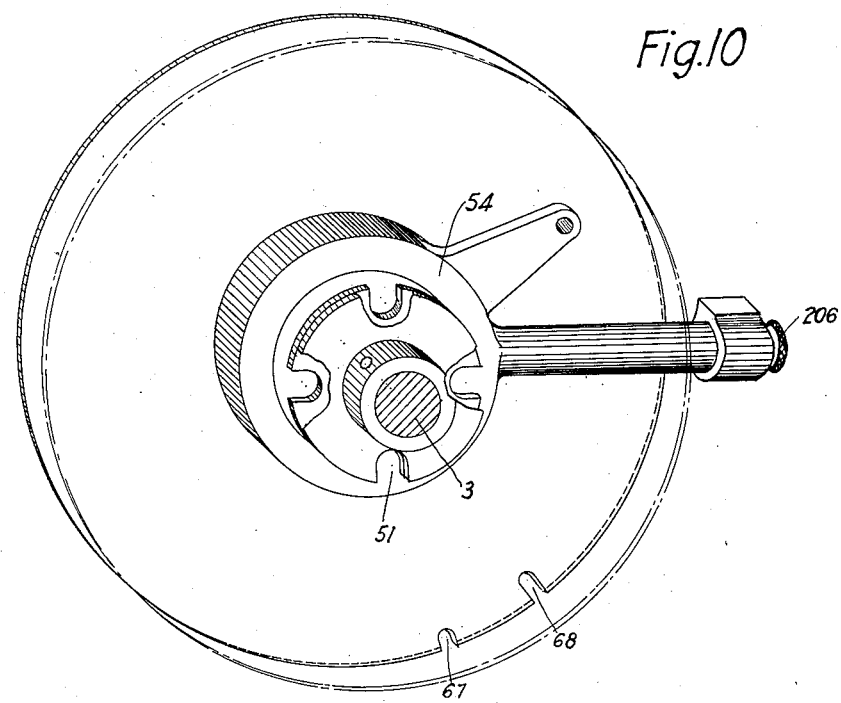
Fig. 10 is a detail showing in part one of the selector disks and its operating mechanism.

The selector disks move through a maximum of 90 degrees during a normal operation and therefore the disks may be divided into 90 degree units and each 90 degrees may have separate notches cut therein so that different combinations of change may be secured. For instance, as shown in Fig. 5 the disk 66 has in one quadrant four notches progressively increasing in depth in a clockwise direction so that assuming that the disk 66 returns nickels, 198 would return one nickel, 199 two nickels, 200 three nickels, 201 four nickels according to the coin inserted and the amount to be taken out. The other quadrant of the disk 66 containing notches might have any other suitable combination cut so as to give, for instance, in changing a fifty-cent piece where one fare was retained, notch 202 one nickel, 203 three nickels, 204 two nickels and 205 two nickels. The above illustrations are purely as a matter of explanation and merely to give the idea that the notches may be cut in the different quadrants of each of the disks so as to give many combinations of change to suit local conditions. As shown in Fig. 5, the disk 66 is connected to operate in a quadrant containing notches 198 to 201, that is to say, a spring-pressed pin 206 connects the disk 66 with the member 54 as shown in Fig. 6, so that the disk is held as shown in Fig. 6. If it were desired to change the combination, the pin 206 would be pulled outwardly, whereupon the disk would be free to rotate upon the member 54 so that any desired quadrant might be selected, whereupon the pin 206 would snap into the proper opening to hold the disk relatively to the member 54. An enlarged view of these elements is shown in Fig. 10.

Referring now to Fig. 40, which shows a diagram of the electrical circuits, the same comprises a battery 214, one side of which is connected to the member 160 upon which the coins rest preliminarily to being deposited in the coin receptacle. At that time, the coin, depending upon its size, engages contact 215, 216, 217, 218 or 219, the coins for one dollar, fifty cents, twenty-five cents, five cents and ten cents engaging with these contacts respectively. Upon the deposit of a coin of the proper denomination, the circuit is closed through one of the magnets 146 to 149 inclusive so as to operate the magnets as will be explained presently. Upon deposit of a nickel, the contact 218 will be closed, whereupon the circuit will be closed, through the magnets 137 as follows: From the battery through wire 220, member 160, the coin contact 218, wire 221, coils 137, wire 222, to the battery. The fare will therefore be automatically registered upon the payment of a nickel or any other coin which designates the fare. When a ten-cent piece is deposited, a circuit will be closed through the magnet 146 through contact 219, switch 210, contact 211, and the machine is so arranged that a nickel will be returned. However, if two fares are to be taken, the key 124 will be depressed, thereby bringing switch 210 in engagement with contact 212 whereby two fares will be registered through the magnets 137.

When it is desired to return the change, the handle 4 will be operated and, upon its initial movement, switch 223 will be moved into engagement with contact 224 and close the circuit through the ejector magnets 91. The mechanical connections for this operation have already been described, it being remembered that the switch 223 is rigidly connected to and movable with the member 93, as shown in Figures 4, 5 and 6.

Briefly, the operation of the machine is as follows: It being desired that the machine retain one fare, and a dime being tendered, the same is dropped into the slot 159 whereupon the same rolls down the member 160 until it comes into engagement with contact 219. This closes a circuit as explained in connection with Fig. 40 through the magnet 146. When this magnet is energized, it pulls its armature corresponding to the arm 154 in Fig. 6 upwardly thereby moving the member 35 forward, as shown in Fig. 17, which causes the member 5 to move to the right, so that the hook 41 engages the member 42 and moves the same downwardly. This releases the handle 4 by removing the pawl 45 therefrom as shown in Fig. 4. The movement of the member 5 raises the member 26 to connect the proper selector disk to the shaft 3. The handle is then moved in a counterclockwise direction, as shown in Fig. 4, and through the speed up gears the proper selector disk is rotated to the proper position in view of the mechanism shown in Fig. 18, that is, until the member 113 engages the key 124. Upon the movement of the handle, the mechanism shown in Figs. 35 to 38 inclusive is operated, which causes the coin to be deposited in the proper receptacle. At the same time the proper circuits are closed for operating the ejector magnets whereupon a nickel is discharged, the same being the correct change.

In the preceding description I have used the word "fare" in speaking of the amount retained by the machine. I have used this word throughout the application and in the claims in a generic sense, meaning thereby that word, wherever it appears in the case, means any amount that may be retained by the machine, such as a fare, admission fee, or sale, or any other similar thing.

I have described above the detailed arrangement for carrying out the principle of my invention, but I desire not to be limited to the particular means shown and described, as those means are used merely for the purpose of illustration.

Having described my invention, what I claim as new and desire to secure by Letters Patent is:

1. In a machine of the character described, the combination of a plurality of coin receptacles, means for ejecting coins therefrom, said means being arranged to simultaneously eject one or more coins of any of a plurality of different denominations from the corresponding receptacles, and means operative upon the deposit of a coin in said machine for causing the selective operation of said ejectors, said means responding to the combined operation of means indicating the value of the coin tendered and the number of fares to be paid.

2. In a machine of the character described, the combination of a shaft, a plurality of selector disks mounted on said shaft, means causing certain selected ones of said disks to rotate with said shaft, means corresponding to the number of fares paid for limiting the rotative movement of said shaft, and means responsive to the coin tendered for selecting the disks that rotate with said shaft.

3. In a machine of the character described, the combination of a plurality of coin containers, means for ejecting coins therefrom, means for selectively operating said ejecting means comprising a plurality of disks having notches therein, and means for selecting and rotating the disks in accordance with the coin tendered, and means on the ejectors cooperating with said notches to determine the amount of coin to be ejected from said receptacles.

4. In a machine of the character described, the combination of a plurality of selector disks, a shaft on which said disks are normally loosely mounted, means operative upon the deposit of a coin for fixing certain of said disks on said shaft, means for rotating said shaft, and means designating the number of fares to be taken from said deposited coin, said means limiting the rotative movement of said shaft and disks.

5. In a machine of the character described, the combination of a plurality of coin receptacles, ejector bars for ejecting coins therefrom when raised, means for raising said bars an amount sufficient for the ejection of one or more coins from a given receptacle, a plurality of disks, one for each ejector bar, means dependent upon the coin deposited and the number of fares to be retained therefrom for selectively operating said disks, and means on the disks for controlling the ejector bars to return the unclaimed balance in value of the deposited coin.

6. In a machine of the character described, the combination of a plurality of coin receptacles, ejectors for ejecting one or more coins from each of said receptacles, means for raising said ejectors an amount dependent upon the number of coins desired to be ejected, said means including a spring normally ineffective, selector disks having notches of different depths therein, means on the ejectors cooperating with said notches and forced thereinto by said springs when under compression, means dependent both upon the value of the coin deposited and the number of fares to be retained therefrom for setting the proper notches in the proper selector disks opposite the means on the ejectors, means for placing the springs under compression, and means for operating the ejector bars.

7. In a machine of the character described, the combination of a slidable bar for each denomination, means operative upon the deposit of a coin for moving said bar which upon movement locks the bars for other denominations, selector disks, a shaft, means operated by said bar for operatively connecting certain of said disks to said shaft, means on said disks for controlling the amount of change to be returned, and means for rotating said shaft and disks in accordance with the number of fares to be retained.

8. In a machine of the character described, the combination of a shaft, a plurality of selector disks loosely mounted on the shaft and biased in normal zero position, means operated by the coin deposited for fixing a selected number of said disks on said shaft, a plurality of notches of different depths in said disks allowing for one or more coins to be ejected from the machine, ejectors, means cooperating with the ejectors and said notches for controlling the number of coins to be ejected, means for rotating the disks in accordance with the number of fares to be retained to bring the selected notch opposite the ejector controlling means, and means for operating the ejectors.

9. A change making machine having means for accepting various denominations of metal coins and retaining a fixed amount or multiple thereof, and means for adjusting the machine to vary the fixed amount without adding or removing parts, said means for adjusting the machine to vary the fixed amount being such that it can be set so the said means may be used without resetting for a plurality of change makings.

10. In a machine of the character described, the combination of a shaft, a plurality of selector disks on said shaft, means for selectively rotating said disks, the rotation of said means depending upon the number of fares to be paid, and means controlled by the position of said disks for determining the amount of change returned.

11. In a machine of the character described, the combination of a plurality of coin containers, means for depositing coins in one end thereof, means for ejecting coins from the other end thereof, said last means comprising a plurality of selectors having means controlling the number of coins to be ejected from each container at each operation, and means for controlling said selectors dependent upon the coin deposited and the value of the amount to be retained from said coin.

12. In a machine of the character described, the combination of a plurality of coin receptacles, means for ejecting coins from said receptacles, means for determining the number of coins to be ejected from each receptacle, the selective operation of said last means being dependent upon the amount and number of fares to be retained, and means for changing the amount of each fare.

13. In a machine of the character described, the combination of a shaft, selector means mounted on said shaft, means normally holding said shaft against rotation, means operated upon the tender of a coin for removing said holding means, and means for preventing the reverse operation of said shaft until after it has moved to the normal end of its travel.

14. In a machine of the character described, the combination of slide bars operative upon the deposit of coin in the machine, a plurality of selectors, means cooperating with said selectors for determining the number of coins to be ejected, a plurality of normally ineffective springs for rendering said last means effective, and means operated by said slide bars for making said springs effective.

15. In a machine of the character described, the combination of a plurality of coin containers, means for ejecting coins therefrom including an ejector movable to different positions longitudinally of each receptacle for ejecting different numbers of coins therefrom, means for selectively operating said ejecting means comprising a plurality of disks having notches therein, means for selecting and rotating the disks in accordance with the coin tendered, and means on the ejectors cooperating with said notches to determine the amount of coin to be ejected from said receptacles.

16. In a machine of the character described, the combination of a shaft, selector disks mounted thereon, magnetic means for connecting the proper disks with the shaft, and means for rotating the shaft.

17. A change making machine having means for accepting various denominations of metal coins and retaining a certain fixed amount or multiple thereof and returning the required change to the operator, disks for controlling the coins returned to the operator, said disks being adjustable so that in any one adjusted position the disks cause the corresponding change to be returned to the operator in all subsequent operations until a different adjustment is made.

18. A change making machine having means for accepting various denominations of metal coins and retaining a fixed amount or multiple thereof and returning the required change to the operator, disks to control the returned coins, means for adjusting said disks to return different amounts to the operator upon the insertion of any one coin whereby the fixed amount retained or the multiple thereof will be varied.

19. A change making machine having means for accepting various denominations of metal coins and retaining a certain fixed amount, means to cause said machine to retain multiples of said fixed amount, and adjusting means to vary the fixed amount or multiple retained, operative in all subsequent change makings until a new adjustment is made.

In testimony whereof, I have signed my name to this specification.

RICHMOND M. McGEE.